Dec. 7, 1965   R. C. BIRKEBAK   3,222,522
INFRARED DETECTOR UTILIZING AN
INTEGRATING SPHERE RADIOMETER
Filed April 29, 1963   2 Sheets-Sheet 1
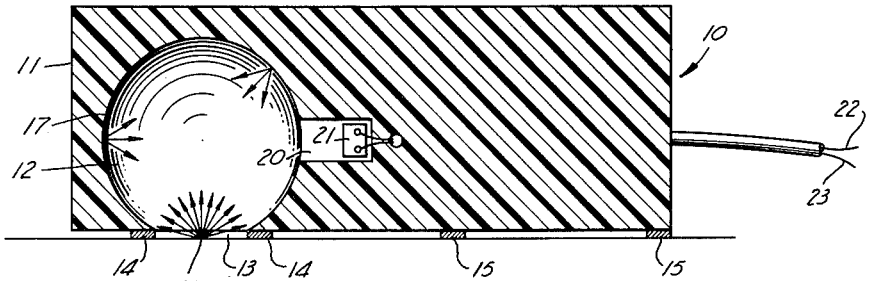
Fig- 1 -
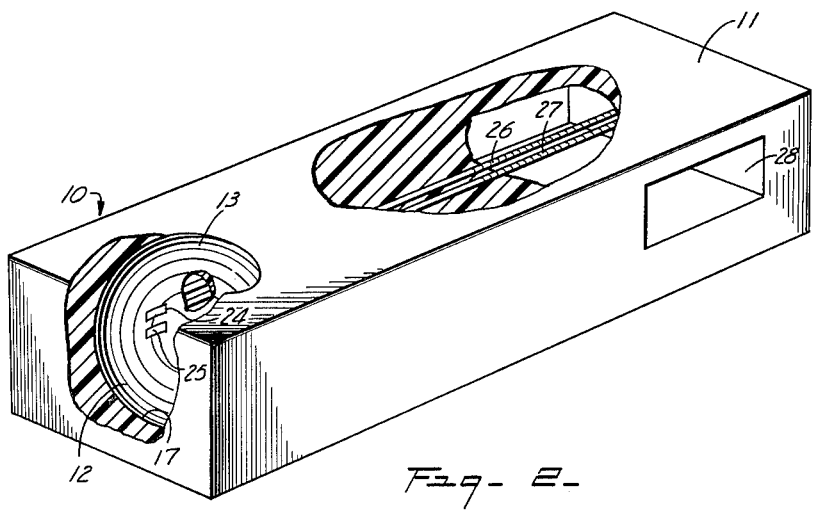
Fig- 2 -
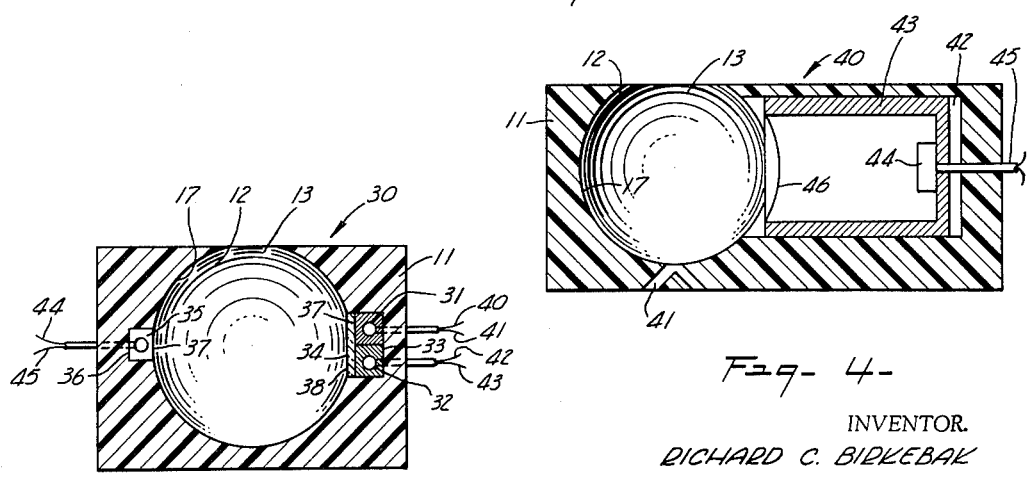
Fig- 3 -
Fig- 4 -
INVENTOR.
RICHARD C. BIRKEBAK
BY
Schroeder & Siegfried
ATTORNEYS Dec. 7, 1965   R. C. BIRKEBAK   3,222,522
INFRARED DETECTOR UTILIZING AN
INTEGRATING SPHERE RADIOMETER
Filed April 29, 1963   2 Sheets-Sheet 2
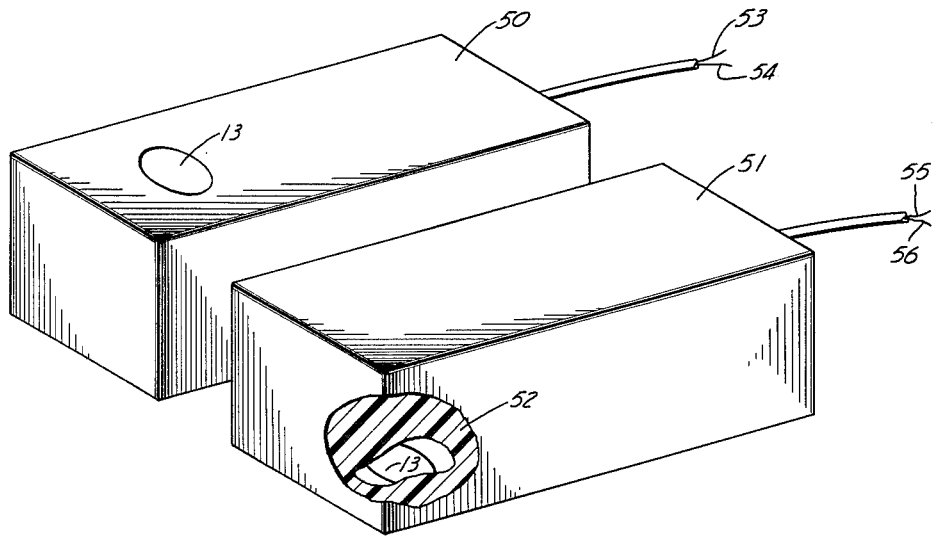
Fig-5-
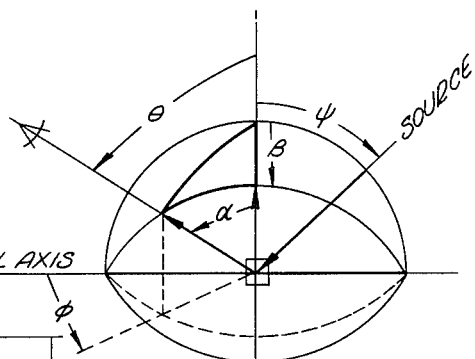
Fig-6-
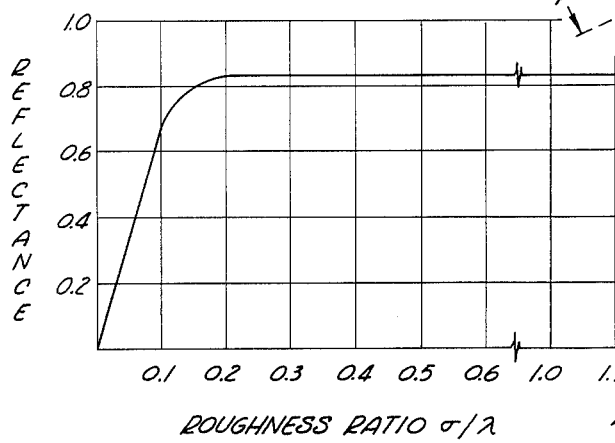
Fig-7-
INVENTOR.
RICHARD C. BIRKEBAK
BY
Schroeder & Siegfried
ATTORNEYS

United States Patent Office 3,222,522
Patented Dec. 7, 1965

3,222,522
INFRARED DETECTOR UTILIZING AN INTE-
GRATING SPHERE RADIOMETER
Richard C. Birkebak, 1828 Arona, St. Paul 13, Minn.
Filed Apr. 29, 1963, Ser. No. 276,238
11 Claims. (Cl. 250—83.3)

This invention relates to the field of integrating sphere radiometers and more especially to the field of integrating sphere radiometers used for infrared detection.

Generally speaking, the integrating sphere has been used only for reflectance and transmittance measurements of energy sources in the visible spectrum. The integrating sphere, in a manner of speaking, operates in a manner independent of the direction from which the energy comes from as long as the energy is reflected or scattered about its interior. Generally, the inner surfaces of the integrating sphere have coatings of white diffuse paint, magnesium carbonate, or magnesium oxide smoked on highly polished metal surfaces.

However, to have a more useful instrument, the integrating sphere should not only be usable for the detection of visible energy but also should be usable for the detection of infrared energy. Such a device has not been available where it is desirable to measure one type of energy over the other or to measure them both at one time with the same instrument.

The present invention contemplates providing a radiation detection apparatus having a suitable surface coating which have reflectances in the infrared spectrum that are independent of wave length. The interior surface of the sphere has a diffuse reflector surface and a constant and high reflectance value in the spectral region of interest. With a device of this type, if a bundle of radiation is directed into the interior of the sphere, the radiation density within the sphere due to multiple reflections will be uniform at any point on the interior surface. The invention set forth herein provides a device which operates in this manner in the visible region of the spectrum as well as in the infrared region. Two materials for providing such a diffuse reflecting surface are ground materials of high reflectivity and a layer of sulfur. It has been found particularly desirable to use the ground surface in situations requiring that the device operate in a vacuum where sulfur becomes very unstable. It has also been determined that a suitable surface is obtained by sand blasting, grinding, using optical grinding compounds and techniques, by chemical and electrical etching, etc. The surface is then generally coated with a highly reflecting material such as gold, aluminum, platinum, etc. for the best results. The material which is used as the substrate may be of glass, metal, plastic, or any other suitable material upon which a highly reflective coating of metal may be deposited.

It is therefore a general object of the present invention to provide an improved radiant energy detecting apparatus.

It is still another object of the present invention to provide an improved infrared detection apparatus.

It is still a further object of the present invention to provide integrating sphere apparatus which includes thermal insulation means having an isothermal enclosure in which the sensor has been placed.

It is yet another object of this invention to provide an improved integrating sphere having a diffuse reflector surface.

It is still a further object of the present invention to provide an integrating sphere with a diffuse reflector surface formed from roughened material coated with a highly reflecting metal.

It is yet another object of the present invention to provide a diffuse reflecting surface in an integrating sphere by using a layer of sulfur.

It is still a further object of the present invention to provide a radiant energy detecting apparatus for detecting both visible and infrared energy.

It is still another object of the present invention to provide radiant energy detecting apparatus for detecting and measuring total direct and diffuse irradiation produced by the visible and infrared spectrum.

It is yet another object of the present invention to provide radiant energy detecting apparatus for detecting total direct and diffuse irradiation produced by the visible and infrared spectrum while measuring the visible irradiation and infrared irradiation separately.

It is still another object of the present invention to provide a radiation detecting apparatus for detecting the difference between incoming visible with infrared radiation from a source and that from a body reflected from the source.

These and other objects and advantages of this invention will more fully appear from the following description, made in connection with the accompanying drawings, wherein like reference characters refer to the same or similar parts throughout the several views, and in which:

FIG. 1 is a cross-sectional view of the radiation detector in a position to detect radiation from a given source;

FIG. 2 is a view of an integrating sphere having a pair of sensors in communication with the sphere (portions of which are shown broken away);

FIG. 3 is a cross-sectional view of an instrument which can be used to measure a total visible radiation and total infrared radiation as separate quantities;

FIG. 4 is a cross-sectional view of a radiation detecting apparatus having a thermal insulation which includes an isothermal enclosure and using interchangeable filters;

FIG. 5 shows the radiation detecting apparatus being used to measure the net radiation exchanged between objects;

FIG. 6 is a diagram of a typical coordinate system employed in detecting the radiation from a given source; and FIG. 7 is a curve showing the total diffuse reflectance of the present invention as a function of the roughness ratio of the diffuse reflector surface.

In order to get a proper understanding of the invention, it appears worthwhile to set forth some of the basic material in establishing the usefulness and operativeness of the integrating sphere radiometer when uesd in the infrared region. Generally speaking, the relative reflectance R of a material is equal to the ratio of the intensity of the radiation at a given angle of scattering $(\theta, \phi)$ to that at the specular peak $(\phi=0, \theta=\psi)$, and is expressed by the formula:

$$R = \frac{i(\theta, \phi)}{i_s} = \frac{P(\theta, \phi)}{P_s}$$

where $i(\theta, \phi)$ is the intensity in the direction of the scattering angles $(\theta, \phi)$,
$i_s$ is the intensity in the specular direction,
$P(\theta, \phi)$ is the bidirectional reflectance,
$P_s$ is the reflectance in the specular direction,
$\theta, \phi$ are the scattering angles as found in FIG. 6, and
$\psi$ is the angle of incidence.

It can also be shown that by using the relationships from spherical geometry that the relative reflectance R may be expressed as:

$$R = \frac{(\cos\theta + \cos\psi)^2}{(2\cos\psi)^2} \left[ \exp. -\frac{\alpha^2}{2\beta^2} \left\{ \frac{(\sin\theta\cos\theta - \sin\psi)^2 + \sin^2\theta\sin^2\phi}{(\cos\theta + \cos\psi)^2} \right\} \right]$$

where

Exp. is the base of natural logarithims ($e$).

$\beta$, measured in microns, is defined as the root mean square deviation of the surface from the mean surface level, and where $\alpha$ is the autocovariance length of the surface roughness.

From the last equation it can be seen that the key to the whole equation is in the term $$\left(\frac{\alpha^2}{2\beta^2}\right)$$

The above equation is derived for the case of negligible specular reflectance and the independent variable $$\frac{\alpha^2}{\beta^2}$$

has been found to produce satisfactory results when taking on a value between 10 and 20. It should be kept in mind that the equation above will produce a particular relative reflectance for a given wave length and if the wave length is changed, the relative reflectance may also change. However, it has been determined experimentally that the optimum size of particles on the face of the surfaces is a function of:

$$\frac{\sigma}{\lambda}$$

which is defined as the optical roughness ratio, where $\lambda$ is the radiation wave length in microns.

For a value of $$\frac{\alpha^2}{\sigma^2}$$

equal to 10, and the optical roughness ratio $$\frac{\sigma}{\lambda}$$

increasing to larger values, it has been found the diffuse reflectance approaches a constant value. Since the total reflectance is composed of a specular component and a diffuse component, it can be shown that as the surface becomes diffusely reflecting, the specular reflectance approaches 0. Therefore, a lower limit on the optical roughness ratio when considering a diffuse reflector will be in the order of 0.20, which is best shown in FIG. 7. In other words, as the size of the particle forming the diffuse reflecting surface increases with respect to the wave length of the radiation, the specular reflectance will go to zero just before reaching a value of approximately 0.20.

Keeping in mind the teaching which has just been set forth, a radiant energy detector 10 is shown in FIG. 1. The detecting apparatus has a housing formed of a thermal insulation material 11 in which an integrating sphere radiometer 12 is situated. The integrating sphere radiometer has an opening 13 which is exposed to the outer portion of the insulation 11 by off setting the sphere so that a portion thereof is exposed and faces outwardly. In the particular embodiment shown, a felt or mica ring 14 and several insulating strips 15 are used to isolate the insulation material from the body which is to have its radiation measured. A source of radiation 16 is shown diagrammatically emitting rays into the integrating sphere radiometer. The surface 17 of the integrating sphere radiometer is a diffuse reflector and may be formed in a manner previously described by sand blasting, grinding, using optical grinding compounds and techniques, or by chemical and electrical etching, etc. Also, the inner surface of the integrating sphere radiometer may be coated with a layer of sulfur. If the surface is roughened, it is then generally coated with a highly reflecting material such as gold, aluminum, platinum, etc. Situated away from the opening which is adapted to receive the radiation, is a cavity 20 into which a radiation sensitive device 21 is disposed. For convenience, where the sensor is in the form of a thermopile or semi-conductor detector, a pair of electrical leads 22 and 23 are connected thereto and extend outwardly through the insulation 11 where the signals may be utilized. It should be specifically observed that none of the radiation entering the integrating sphere radiometer is directed in a straight line to the detecting device 21. In other words, the only way the energy may be detected is from the energy coming from the walls of the integrating sphere radiometer. The device as shown in FIG. 1 is in a position to measure the infrared energy being emitted from source 16 which in this case could be a body or may even be the earth.

Another simple form of the invention is shown in FIG. 2 where a radiant energy detector 10 is formed in a manner similar to that found in FIG. 1. The radiant energy is directed into opening 13 where it falls upon the diffuse reflector surface 17 of the integrating sphere radiometer 12. The corner is broken away to show the integrating sphere radiometer and situated in the surface of the integrating sphere are a pair of metal blocks 24 and 25. These blocks are fitted into cut-out portions of the surface of the integrating sphere so that they form a part of the surface. Block 24 is painted black on the surface which forms part of the integrating sphere and block 25 is painted white. A pair of thermometers 26 and 27 engage blocks 24 and 25 respectively, so that the temperature detected by the blocks is transmitted to the thermometers. A cut-out portion 28 is formed in the side of the insulating material 11 so that thermometers 26 and 27 may be observed and the differences in the temperature may be compared. This type of device will then detect the solar irradiation and the long wave length or infrared irradiation from the source in both a direct and diffuse manner and therefore, the total radiation of the source may be detected and measured. It can then be shown that:

$$S = k\overline{T}^3(T_1 - T_2)$$

where

S is the incident energy measured, $k$ is a calibration constant, $\overline{T}$ equals $$\frac{T_1 + T_2}{2}$$

$T_1$ is the temperature of the black surface, degrees, Rankine, $T_2$ is the temperature of the white surface, degrees, Rankine.

Since it is sometimes desirable to measure the infrared energy and visible or solar energy as separate quantities, a device such as that found in FIG. 3 may be used. A radiant energy detector 30 is shown having an insulation material 11 forming the outer housing of the detector. Again, the detector 30 is directed towards the source and an opening 13 faces the source to be measured where an integrating sphere radiometer 12 is used having a diffuse reflector surface 17. A pair of sensors such as thermocouples, thermistors, or thermopiles 31 and 32 are situated in a cavity 33 adjacent the surface of the integrating sphere radiometer. Situated between detectors 31 and 32 is a quartz window 34 or any other suitable material which will allow only solar energy to pass therethrough. Another sensor 35 is located in a cavity 36 in another part of the insulation 11 of the radiation detector 30. The surface of sensors 31 and 35 are coated with a black substance 37 and sensor 32 has an inward facing surface 38 which is coated white. The signals from sensor 31 are transferred by a pair of leads 40 and 41 while the output signals from sensor 33 are transferred by a pair of leads 42 and 43. Sensor 35 provides this output on a pair of leads 44 and 45.

In this type of device where the three sensors are used, it is found the device to be most useful in determining the total amount of solar radiation and the total amount of infrared radiation as separate quantities. Since the quartz window or filter 34 blocks out all the infrared radiation, the difference in the signals supplied by sensors 31 and 32 is a measure of the total solar or visible energy. This can be shown in the following manner:

$$S_1 = \bar{k}(T_B - T_W)$$

where $S_1$ = incident solar or visible energy detected,
$\bar{k}$ = a calibration constant,
$T_B$ = temperature detected by sensor 31 in degrees, Rankine,
$T_W$ = temperature detected by sensor 32 in degrees, Rankine.

It should then be quite apparent, that by finding the difference of the signals between sensors 35 and 32, that the total infrared energy may be determined which is radiated from a source. This energy is defined by the following equation:

$$S_2 = \bar{k}(T_{B_0} - T_B)$$

where $S_2$ = incident infrared energy detected,
$\bar{k}$ = a calibration constant,
$T_{B_0}$ = temperature detected by sensor 35, degrees, Rankine,
$T_B$ = temperature detected by sensor 32, degrees, Rankine.

It is also possible to improve the characteristics of the radiation detecting apparatus by improving the qualities of the integrating sphere radiometer. One such method of improving the operation is that shown in FIG. 4 where it is desirable to measure sky radiation. A radiant energy detector 40 is shown having a housing of insulating material 11 into which an integrating sphere 12 has been formed with an opening 13 directed towards the irradiating body or surface. The particular device shown in FIG. 4 is designed to be uncovered and hence has a drain 41 formed in the bottom thereof to drain off moisture which may have accumulated. A cavity 42 is formed in the insulation 11 and an isothermal enclosure 43 is formed therein which may be made from a material such as copper which dissipates heat quite readily along its entire surface. With such an enclosure, the effects of ambient air temperature changes are substantially eliminated and correction effects are not needed. Situated within the isothermal enclosure 43 is a sensor 44 which may be a thermopile or semi-conducting device having its signals brought out through electrical leads 45. Since it is also desirable to be able to detect either infrared energy or solar energy, a filter 46 is supplied at the entrance to the isothermal enclosure. The filter is fitted in an opening along a segment of the inner surface of the integrating sphere 12. As mentioned earlier, the filter or lens 46 may be formed of quartz or certain types of other material for blocking infrared energy while passing solar energy, or the filter may be formed from certain salt crystals or "Irtan" which is supplied by the Eastman Kodak Company, for passing infrared energy and blocking solar energy.

In some situations, it may be desirable to measure the net radiation exchange between bodies, i.e., the difference between incoming solar and infrared radiation and that reflected from the earth or another body. By constructing the detectors so that one of the instruments is pointed towards the irradiating source and the other is pointed towards an object which may reflect the energy being irradiated, the net radiation may be determined. Such a device is shown in FIG. 5 where the radiation detecting apparatus is formed from a pair of detectors 50 and 51. Detectors 50 and 51 are formed in the same manner as that shown in FIG. 1 where opening 13 in detector 15 is directed upwardly while opening 13 of detector 51 is directed downwardly. This is shown through a broken section 52 of detector 51. It should be apparent that in order to determine the net amount of radiation, it is necessary that the total energy directed towards the detectors from the source must have the amount of energy reflected towards the sensors from another object, subtracted therefrom to give a true value. Therefore, where a pair of leads 53 and 54 provide signals representative of the direct radiation, and a pair of leads 55 and 56 provide signals representative of the reflected radiation (it being assumed that the leads are connected to sensors similar to that shown in FIG. 1), the magnitude of the difference in the signals provides a signal representative of the net radiation. This can be determined from the formula:

$$S_n = k(T_1^4 - T_2^4)$$

where $S_n$ = the net incident radiation detected,
$k$ = calibration constant,
$T_1$ = temperature representative of energy detected by detector 50, degrees, Rankine,
$T_2$ = temperature representative of energy detected by detector 51, degrees, Rankine.

Thus, it has been shown and demonstrated that a radiation detecting apparatus is disclosed which works equally as well for solar or visible radiation as for infrared radiation. The device employs an integrating sphere radiometer having a diffuse reflector surface which may be created by roughening the substrate material and having a highly reflecting metal coated thereon or the surface may be formed from a layer of sulfur. It has also been shown that it is feasible to use the device for detecting infrared energy with an integrating sphere radiometer in a vacuum. A radiation detecting apparatus has also been demonstrated having certain isothermal enclosures and filtering devices so that one radiation detector may be used for detecting various types of radiation thereby keeping the detector apparatus relatively simple. It has also been shown and demonstrated that where the roughness ratio of the surface of the integrating sphere is made equal to 0.20 or greater, satisfactory results will be obtained in both the infrared and visible spectrum. The versatility of the device is quite apparent by the simplicity in which the different types of energy may be measured as has been demonstrated.

It will, of course, be understood that various changes may be made in the form, details, arrangement and proportions of the parts without departing from the scope of this invention which consists of the matter shown and described herein and set forth in the appended claims.

What is claimed is:
1. A radiation detecting apparatus comprising:
(a) an integrating sphere radiometer having a diffuse reflector surface with a constant and high reflectance value in the spectral direction for producing a substantially uniform radiation density within said sphere at any point on said diffuse reflector surface, said sphere having at least a pair of openings therein, one of which is adapted to face a source of radiation;
(b) thermal insulation means surrounding said integrating sphere radiometer and having an opening therein registering with the opening of said sphere and adapted to face a source of radiation and having at least one cavity registering with another of said openings in said integrating sphere;

(c) and radiation sensitive means mounted in said cavity of said insulation means and communicating with said opening in said sphere to receive said uniform radiation and produce a signal representative of said radiation.

2. The invention as set forth in claim 1 wherein said radiation sensitive element comprises an infrared sensor of the semi-conductor type.

3. The invention as set forth in claim 1 wherein said integrating sphere diffuse reflector surface is formed from roughened material coated with a highly reflecting metal.

4. The invention as set forth in claim 1 wherein said integrating sphere diffuse reflector surface is formed from a layer of sulfur.

5. In an infrared radiation detecting apparatus, an integrating sphere radiometer comprising:
(a) a housing having at least a pair of openings formed therein, one of which is exposed to radiation having a wave length $\lambda$ of less than 30 microns and another of which is adapted to receive infrared sensing means;
(b) a spherically shaped cavity formed in said housing and communicating with said openings formed therein, said cavity having a roughened diffuse reflector surface for producing a substantially uniform radiation density within said sphere where the roughness ratio of said surface is $\sigma/\lambda = 0.20$ or greater, where $\sigma$ measured in microns is defined as the root mean square deviation of the surface from the mean surface level;
(c) and infrared sensing means mounted in said opening so adapted to receive said means for detecting said infrared radiation and producing signals representative thereof.

6. The invention as set forth in claim 1 wherein said reflector surface is coated with a highly reflecting metal.

7. The invention as set forth in claim 1 wherein said radiation sensitive means includes means for detecting and measuring total direct and diffuse irradiation produced by the visible and infrared spectrum, said means including; a first energy detecting element in said cavity having a white surface communicating with said sphere, a second energy detecting element in said cavity having a black surface communicating with said sphere, a first measuring device in energy receiving relationship with said first detecting element producing a signal representative of the magnitude of solar and infrared irradiation, and a second measuring device in energy receiving relationship with said second detecting element producing a signal representative of the magnitude of solar and infrared irradiation, the quantitative difference in said signals being proportional to the total radiation of said source of radiation.

8. The invention as set forth in claim 1 wherein said radiation sensitive means includes means for detecting total direct and diffuse irradiation produced by the visible and infrared spectrum and measuring the visible irradiation and infrared irradiation separately, said means including; an infrared filter interposed in a first of said cavities adjacent said diffuse reflector surface of said integrating sphere, said filter having a characteristic of passing energy therethrough with a wave length of approximately 2.5 microns and blocking the passage of energy below said value; a first energy detector in the first of said cavities having a white surface and producing a first signal representative of solar irradiation, a second energy detector in the first of said cavities having a black surface and producing a second signal representative of solar irradiation, the quantitative difference between said signals from said first and second detectors being proportional to the total visible radiation of said source of radiation, and a third energy detector in a second of said cavities having a black surface and producing a first signal representative of infrared irradiation, the quantitative difference between said signals from said second and third detectors being proportional to the total infrared radiation of said source of radiation.

9. The invention as set forth in claim 1 wherein said thermal insulation means includes an isothermal enclosure surrounding said cavity formed therein to aid in eliminating the effects of ambient air temperature changes.

10. The invention as set forth in claim 9 wherein radiation filters having predetermined bandwidths are disposed in front of said radiation sensitive means to admit only radiation of a desired wave length.

11. A radiation detecting apparatus for detecting the difference between incoming visible and infrared radiation from a source and that from a body reflected from said source, said apparatus comprising:
(a) a pair of integrating sphere radiometers, each having a diffuse reflector surface with a constant and high reflectance value in the spectral direction for producing a substantially uniform radiation density within said sphere at any point on said diffuse reflector surface, said spheres having at least a pair of openings therein, one of which is adapted to face a source of radiation and the other of which is adapted to face a body reflecting radiation from said source;
(b) thermal insulation means surrounding each of said integrating sphere radiometers, said insulation means having a pair of openings therein registering with the openings of said corresponding spheres and adapted to face in the same direction as said openings in said corresponding spheres and which has at least a pair of cavities registering with another of said openings in each of said integrating spheres;
(c) and a pair of radiation sensitive means, one of which is mounted in each of said cavities in said thermal insulation means and each of which communicates with a corresponding opening in said spheres to receive said uniform radiations and produces a first signal representative of the visible and infrared radiation from a source and produce a second signal representative of the visible and infrared radiation reflected from said source, the quantitative difference in said signals being proportional to the net radiation detected.

References Cited by the Examiner
UNITED STATES PATENTS

| | | | |
|---|---|---|---|
| 2,185,690 | 1/1940 | Lane | 250—228 X |
| 2,474,098 | 6/1949 | Dimmick | 88—14 X |
| 2,540,780 | 2/1951 | Gabel et al. | 250—83 |
| 2,821,103 | 1/1958 | Blet | 88—14 |
| 2,984,747 | 5/1961 | Walker | 250—83.3 X |

RALPH G. NILSON, *Primary Examiner.*

ARCHIE R. BORCHELT, *Examiner.*